(12) United States Patent
Chou

(10) Patent No.: US 6,917,516 B2
(45) Date of Patent: Jul. 12, 2005

(54) RETRIEVABLE DEVICE AND LCD MONITOR

(76) Inventor: Shiau-Fong Chou, No. 11-10, Tien-Fu Li, San-Hsia County, Taipei Hsien (TW)

( * ) Notice: Subject to any disclaimer, the term of this patent is extended or adjusted under 35 U.S.C. 154(b) by 149 days.

(21) Appl. No.: 10/617,743

(22) Filed: Jul. 14, 2003

(65) Prior Publication Data

US 2005/0013099 A1 Jan. 20, 2005

(51) Int. Cl.[7] .................................................. G06F 1/16
(52) U.S. Cl. ........................................ 361/681; 361/679
(58) Field of Search .................................. 361/679, 681

(56) References Cited

U.S. PATENT DOCUMENTS

| | | | | |
|---|---|---|---|---|
| 4,683,465 A | * | 7/1987 | Lake et al. ................ | 361/681 |
| 4,901,261 A | * | 2/1990 | Fuhs ........................ | 361/680 |
| 5,347,630 A | * | 9/1994 | Ishizawa et al. ........... | 345/538 |
| 6,005,767 A | * | 12/1999 | Ku et al. ................... | 361/681 |
| 6,128,186 A | * | 10/2000 | Feierbach ................. | 361/683 |
| 6,504,706 B2 | * | 1/2003 | Stewart .................... | 361/681 |
| 2002/0163776 A1 | * | 11/2002 | Thompson et al. | |

* cited by examiner

Primary Examiner—Yean-Hsi Chang
(74) Attorney, Agent, or Firm—Birch, Stewart, Kolasch & Birch, LLP

(57) ABSTRACT

A retrievable device includes a frame with an open bottom to receive therein a monitor and at least one arm with a first distal end pivotally connected to the frame and a second distal end slidably received in the passage in the monitor. The monitor is able to be slidably and pivotally received in the frame. An elastic element is securely received in the guiding tracks in the frame so that when the guiding elements of the monitor are moving inside the guiding tracks, the elastic element is able to provide a friction to stop the movement of the guiding elements to position the monitor relative to the frame.

3 Claims, 11 Drawing Sheets

US 6,917,516 B2

RETRIEVABLE DEVICE AND LCD MONITOR

BACKGROUND OF THE INVENTION

1. Field of the Invention

The present invention relates to a retrievable device and a monitor, and more particularly to a retrievable device in which an LCD (liquid crystal display) is concealed completely.

2. Description of Related Art

Nowadays, using an LCD as a monitor is a worldwide trend for its high solution and easy mounting. Besides, because more and more people concern about recreations by taking their families outdoors by cars, the facilities inside the cars play an important role in their trips. One thing that is used most to kill the boring time during the trip is the built-in monitor inside the car. The conventional way of mounting the monitor is using a bracket to mount the monitor directly on the ceiling of the car or the control panel such that passengers are able to watch the programs in the monitor. In order to protect the monitor from any kind of damages, the bracket is able to retrieve the monitor from a standing position to a retrieved position. With reference to FIGS. 11 and 12, a conventional bracket supports the monitor A in two different positions, one in the retrieved position and the other in the standing position. However, due to the different supporting methods in these two drawings, the description to the two methods hereinafter is separated. First, the method used in FIG. 11 stands the monitor A is a slanted position so that the monitor A is able to be received and concealed in a cavity in the panel. Then, the method in FIG. 12 applies a pivot shaft B in opposite sides of the monitor A' to facilitate the pivotal movement of the monitor A' such that either the monitor A' is in a concealed position in the back of the passenger's seat or a standing position, the operator is able to easily operate the movement of the monitor A'.

However, in either conventional method, the monitor A or A' can only be supported at a fixed position. That is, the operator cannot adjust the monitor's position to meet different watching positions of the observers in the cars. Especially, the method in FIG. 12 can only pivot within a limited angle θ so that the observing angle within the car is greatly affected.

To overcome the shortcomings, the present invention intends to provide an improved retrievable device in combination of a monitor to mitigate the aforementioned problems.

SUMMARY OF THE INVENTION

The primary objective of the invention is to provide an improved retrievable device to provide a compact size when the retrievable device is folded.

Another objective of the invention is to provide a shock damping effect to the monitor when the monitor is experiencing an impact so that the monitor is protected from damage.

Still another objective of the present invention is that the retrievable device has a frame to slidably and pivotally receive therein the monitor and at least one arm one distal end of which is pivotally connected to the frame and the other distal end of which is slidably connected to the monitor so that when the monitor is descending, the monitor slides along the frame, which drives the distal end of the arm to slide along the monitor. Therefore, the monitor is securely supported by the frame and the arm when the monitor is fully descended.

Other objects, advantages and novel features of the invention will become more apparent from the following detailed description when taken in conjunction with the accompanying drawings, in which:

DETAILED DESCRIPTION OF PREFERRED EMBODIMENT

Figure 1:
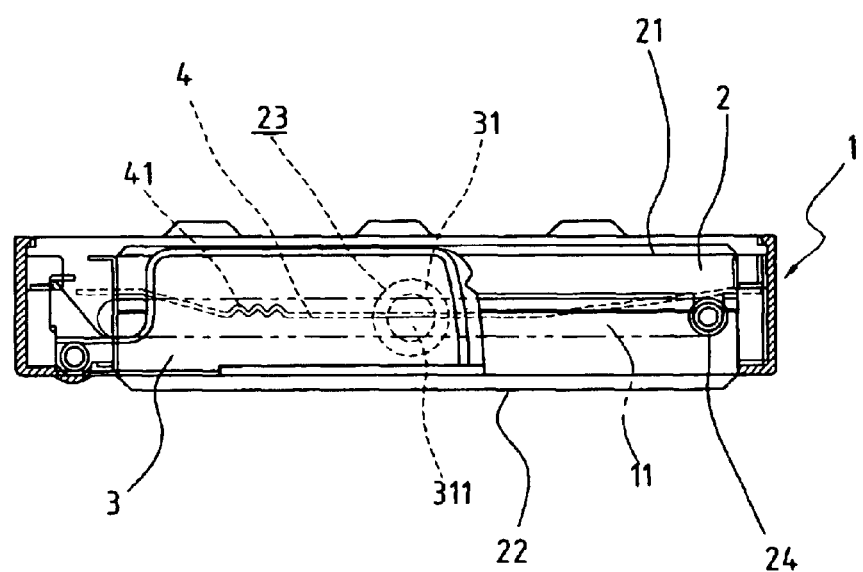
FIG. 1 is a schematic side view in cross section showing the retrievable device and a monitor received in the retrievable device of the present invention.
Figure 2:
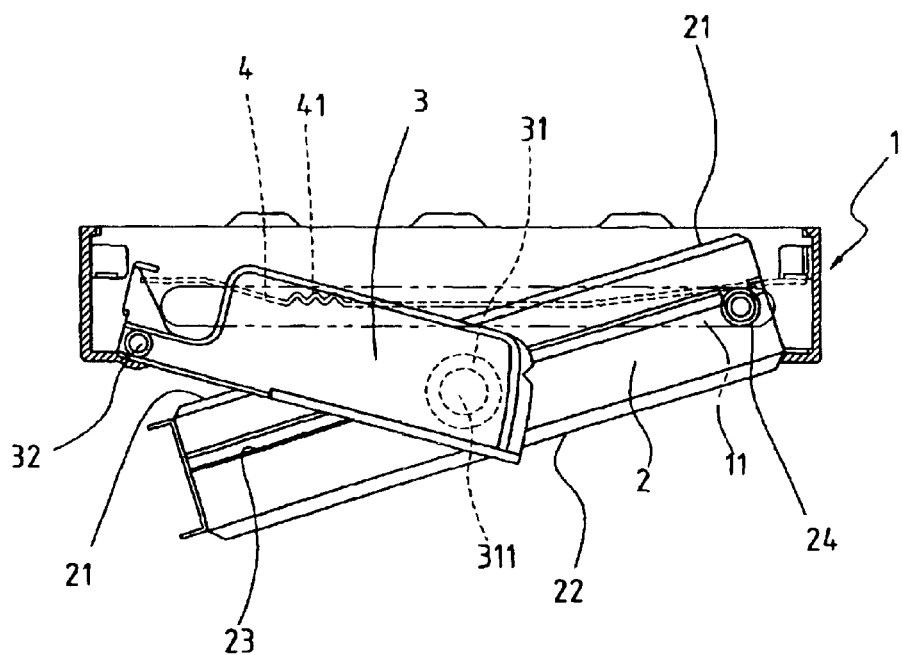
FIG. 2–4 are schematic side views showing the series of downward pivotal movement of the monitor from the frame of the retrievable device.
Figure 3:
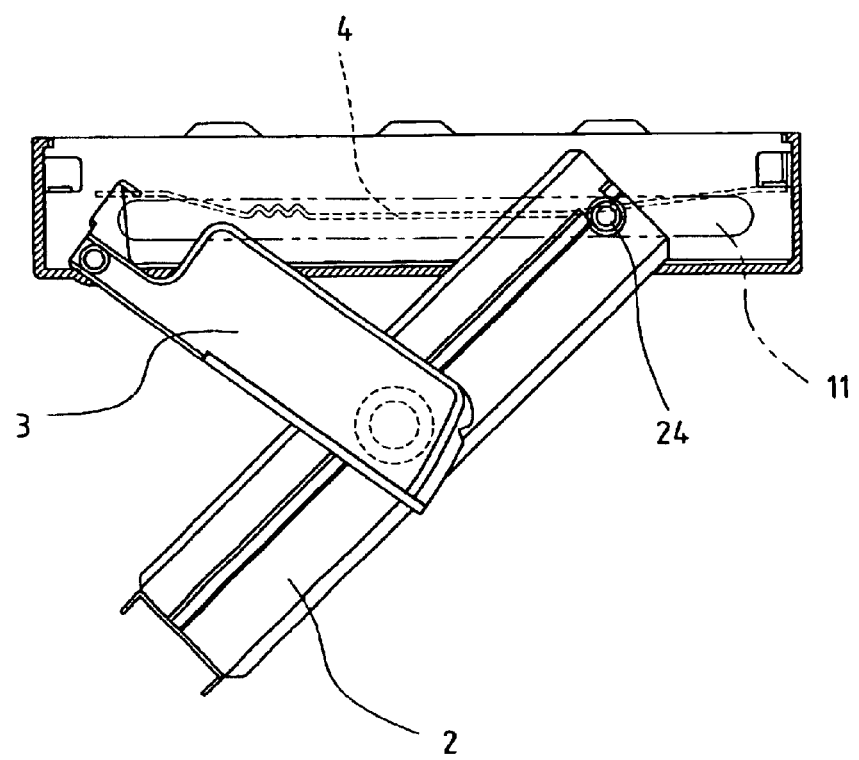
Figure 4:
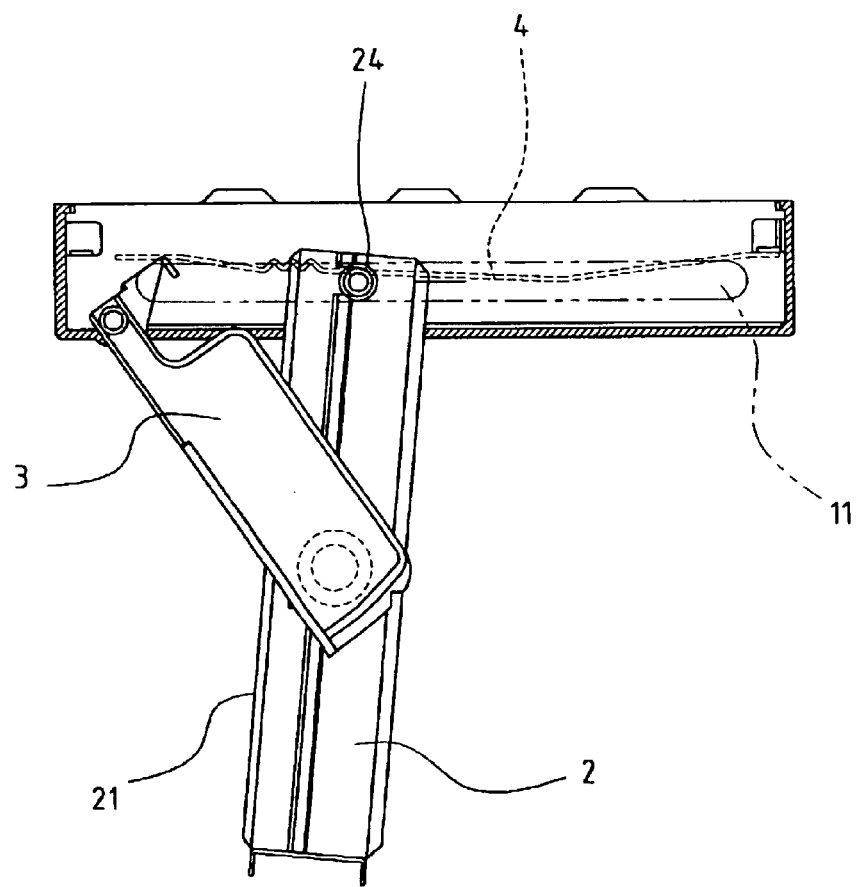
Figure 5:
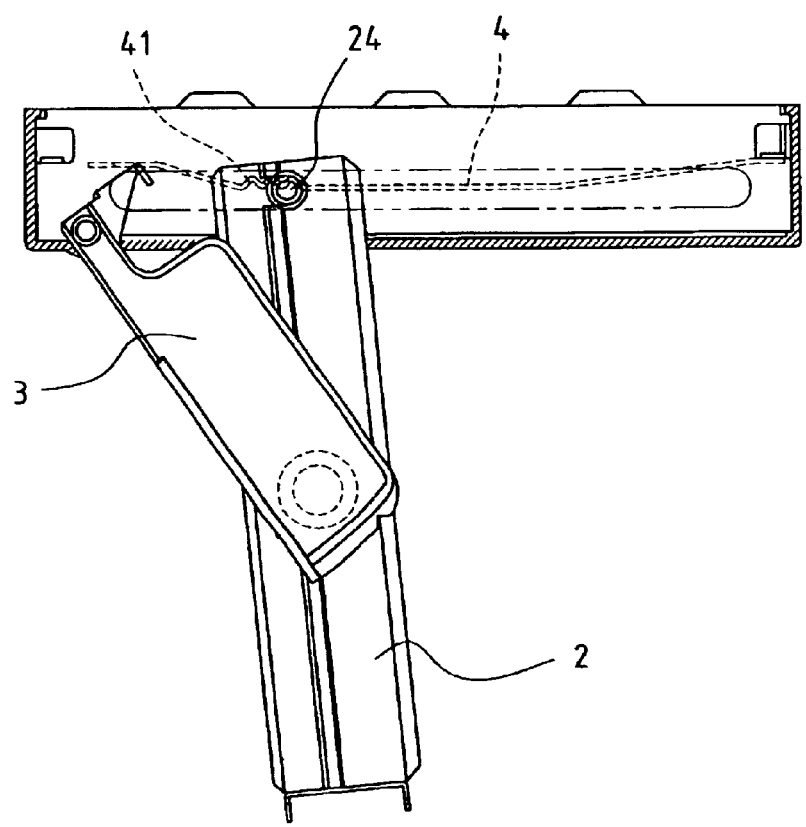
FIG. 5 is a schematic side view showing the central shaft in the monitor is received in a valley of the elastic element.

With reference to FIGS. 1 and 2, a retrievable device in accordance with the present invention includes a frame 1 and at least one arm 3. A monitor 2 is received in the frame 1 and connected to the at least one arm 3.

The frame 1 has an open bottom for receiving therein the monitor 2, side walls and a top face for mounting the frame 1 on an object e.g. a car ceiling or the back of a passenger seat. A guiding track 11 is defined in the frame 1 in opposite side walls. The monitor 2 is a liquid crystal display (LCD) to minimize the size of the monitor and has a guiding element 24 rotatably mounted on opposite sides of the monitor 2 to correspond to and received in the guiding tracks 11 in the frame 1. Preferably, the guiding element 24 is a roller and is received in the guiding track 11 to guide movement of the monitor 2 along the guiding tracks 11. The monitor 2 further has at least one passage 23 to correspond to the arm 3.

The arm 3 has a first pin 32 formed on one distal end of the arm 3 to pivotally connected to the frame 1 and a shaft 31 formed on the other distal end of the arm 3 to be received in the passage 23 of the monitor 2.

Furthermore, an elastic element 4, preferably a leaf spring, is received in the guiding track 11 of the frame 1 and has an undulated pattern 41 formed on a free end of the elastic element 4. Therefore, with reference to FIGS. 3–8, it is to be noted that before the retrievable device in combination with the monitor 2 is in application, the front face 21, the screen, of the monitor 2 is received in the frame 1 and the rear face 22 of the monitor 2 is flush with the bottom of the frame 1, which protects the screen, the front face 21 of the monitor 2 from scratch or any kind of damage. However, when the monitor 2 is pivoted relative to the frame 1, due to the shaft being received in the corresponding passage 23 of the monitor 2, the monitor 2 starts sliding along the guiding tracks 11 of the frame with the guiding elements 24 received in the guiding tracks 11. When the guiding elements 24 reach to the undulated pattern 41 of the elastic element 4, the guiding elements 24 are stopped so that the monitor 2 is positioned and the monitor is ready for watching. In the meantime, the shaft 31 of the arm 3 is still maintained in the passage 23 so that the monitor 2 is able to be maintained at a fixed angle relative to the frame 1.

Figure 6:
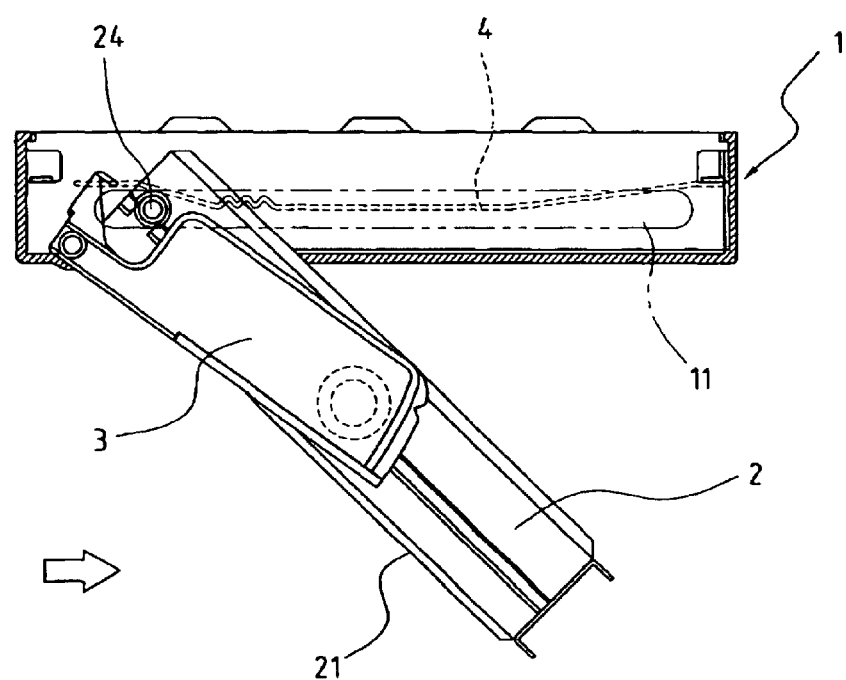
FIGS. 6 and 7 are side views showing that when the monitor is experiencing an impact, the monitor is moving sideward to balance the impact so as to protect the monitor from the impact.

With reference to FIG. 6, when an impact is accidentally hit the monitor 2, due to the guiding elements 24 being rotatably received in the guiding tracks 11 and the shaft 31 of the arm 3 being slidably received in the passage 23, the monitor 2 will only swing a little, which balances the impact so that the monitor 2 is protected from damage.

Figure 7:
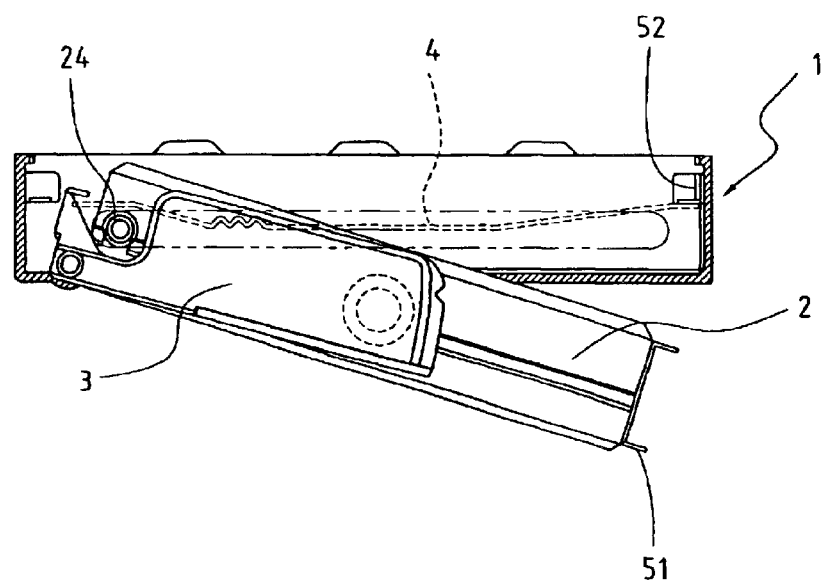
Figure 8:
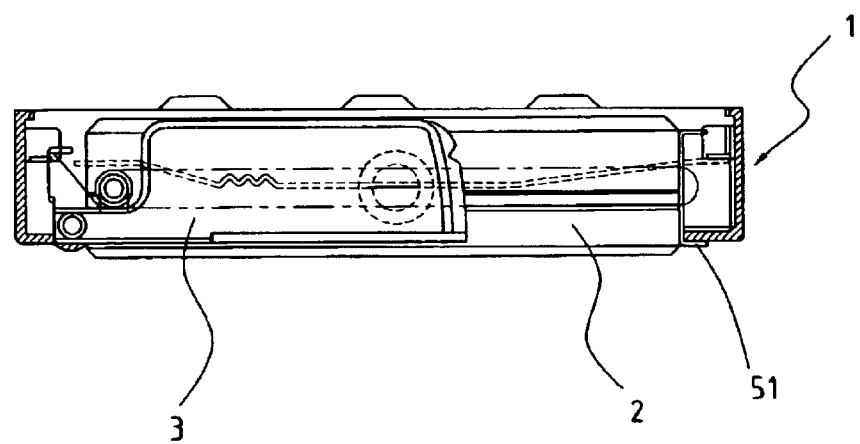
FIG. 8 is a side view showing the monitor is fully pivoted relative to the frame of the retrievable device.
Figure 9:
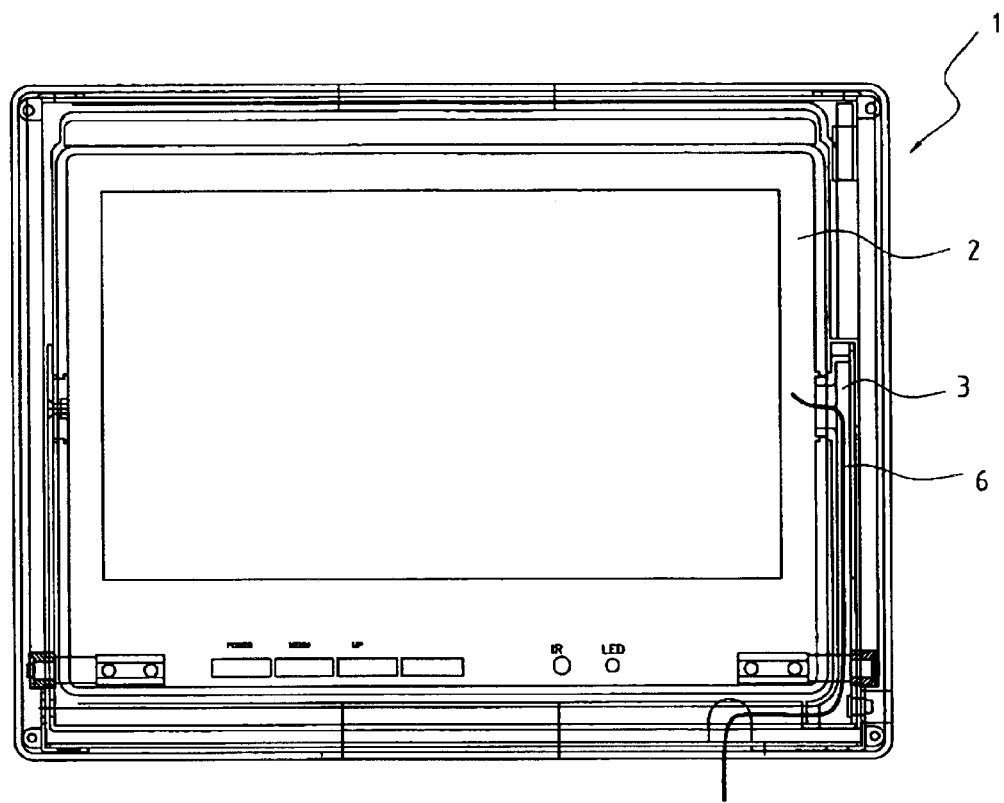
FIGS. 9 and 10 are a front view and a side view, respectively, of the monitor showing the interrelationship between the wire of the monitor and the frame.
Figure 10:
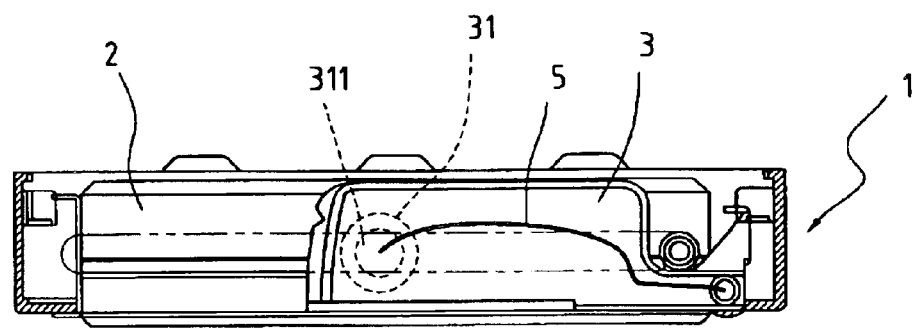
Figure 11:
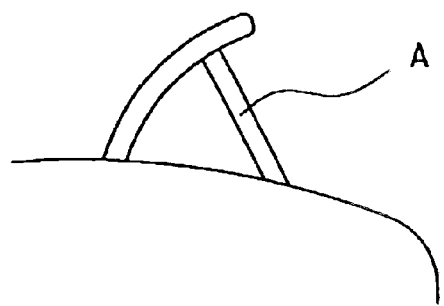
FIGS. 11 and 12 are schematic side views of conventional brackets for a monitor.
Figure 12:
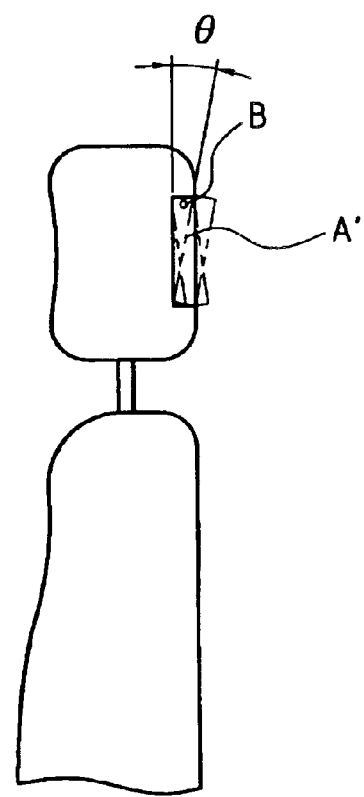

With reference to FIGS. 7 and 8, when the monitor 2 is to be received in the frame 1 again, the operator only needs to push one end of the monitor 2 to have the guiding elements 24 moved toward the first pin 32. Then the monitor 2 is ready to be received in the frame 1. In order to secure the position of the monitor 2 inside the frame 1, a securing element 5 is provided and has an extension 51 formed on a side face of the monitor 2 and a clamp 52 is formed inside the frame 1 so that when the monitor 2 is received in the frame 1, the extension 51 will be clamped by the clamp 52 so as to position the monitor 2 inside the frame 1. Still, with reference to FIGS. 9 and 10, in order to maintain the overall appearance of the monitor combination, the arm 3 is hollow so that the electrical wire is able to be concealed inside the arm 3.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A monitor retrievable device comprising:

a U-shaped frame with an open bottom, side walls and a top adapted for engagement with a surface, the frame having a guiding track defined in two opposite side walls of the frame;

a monitor movably received in the frame and having a passage defined in two opposite side walls of the monitor and a guiding element rotatably mounted on one end of the passage and received in a corresponding one of the guiding tracks;

at least one arm with a first distal end pivotally connected to the frame and a second distal end formed with a shaft to be received in the passage of the monitor, whereby when the monitor is received in the frame, a securing device is provided to secure the monitor inside the frame, when the monitor is released from the securing device, the guiding element slides and rolls along the guiding tracks and due to one distal end of the arm is pivotally connected to the frame and the other distal end of the arm is rotatably and slidably received in the passage of the monitor, the monitor is able to descend for watching.

2. The monitor retrievable device as claimed in claim 1 further comprising an elastic securely element received in the guiding tracks of the frame to provide friction to the guiding elements.

3. The monitor retrievable device as claimed in claim 2, wherein the elastic element has an undulated pattern formed on a free end of the elastic element to stop the guiding elements.

* * * * *